MacKEE B. WALLACE.
EGG CARRIER.
APPLICATION FILED SEPT. 8, 1914. RENEWED FEB. 12, 1917.
1,240,518.
Patented Sept. 18, 1917.
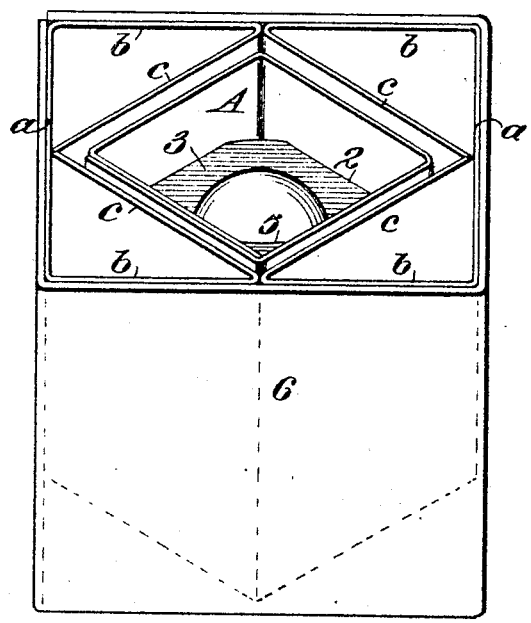
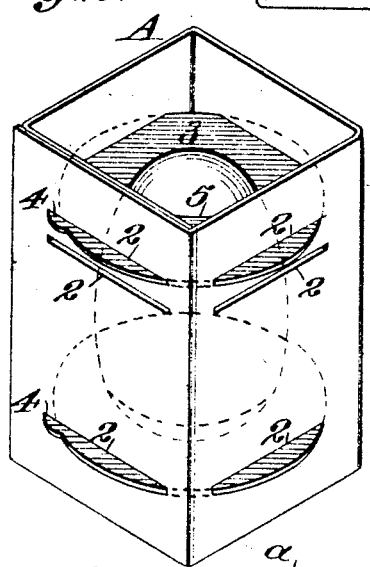
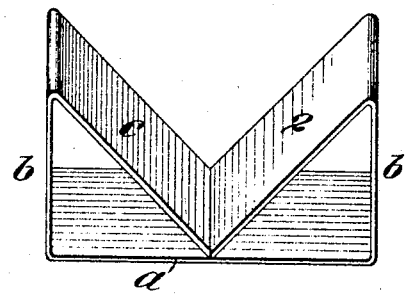
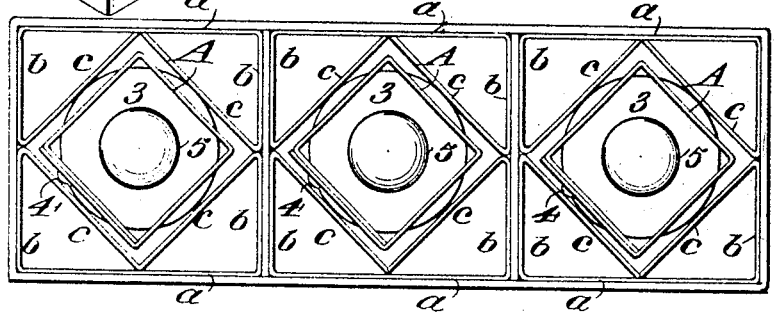
WITNESSES:
Charles Pickles
Thos Lasting
INVENTOR
MacKee B. Wallace,
BY G. H. Strong,
ATTORNEY

UNITED STATES PATENT OFFICE.

MacKEE B. WALLACE, OF SAN FRANCISCO, CALIFORNIA.

EGG-CARRIER.

1,240,518.   Specification of Letters Patent.   Patented Sept. 18, 1917.

Application filed September 8, 1914, Serial No. 860,572. Renewed February 12, 1917. Serial No. 148,256.

*To all whom it may concern:*

Be it known that I, MacKee B. Wallace, a citizen of the United States, residing at the city and county of San Francisco and State of California, have invented new and useful Improvements in Egg-Carriers, of which the following is a specification.

My invention relates to packages for containing and transporting eggs, and like fragile articles.

It consists in an interior container to hold the article in position out of contact with the container walls, and an exterior case having elastic sides, acting as a shock absorber in which the inner container may ride in a certain determined position and be independently supported.

It also comprises an arrangement of parts and details of construction which will be more fully explained by reference to the accompanying drawings, in which—

Figure 1 is an assembled perspective view of a single container.

Fig. 2 is a perspective view of the interior container.

Fig. 3 is a perspective view of a cushion section.

Fig. 4 is an end elevation of a multiple container.

In the present case I describe my invention as especially adapted for containing and transporting eggs, but its application for other articles will be obvious.

For the transportation of eggs, it is requisite that they be relieved of the possibility of fracturing shocks, and where the eggs are designed for the purpose of incubation, it is necessary that they be maintained upon the side, as this is found to produce certain changes which tend to sterilize the egg, which effect is not produced when the egg is kept lying upon its side. My invention provides for such a contingency.

As shown in the drawings, the inner container comprises a card-board, or equivalent wrapper A of sufficient length that when folded, by preferably creasing the angles, it will form a cubical shape, of larger interior diameter than the minor axis of the egg, and longer than the major axis. When folded it may be secured in any suitable manner. Near each end slits 2 are made for the reception of egg holding disks 3, the diameter of which is such that when placed in the slits their edges project beyond the sides of the part A, so as to contact with the sides of an inclosing cushion, and they may also have peripheral lugs 4, which by turning the disks, will lock the sides of the wrapper when folded about the disks after the egg is in place. Apertures 5 are made in the disks, into which the ends of the egg project, thus holding the egg firmly within the wrapper, and out of contact with the sides, while the wrapper is long enough to extend beyond the ends of the egg and being open at each end, it enables the operator to candle the eggs without removal from the wrapper.

This container is placed within a shock-absorbing cushion, which is here shown as made with an exterior rectangular case 6 of suitable material, within which the cushions are fitted. These cushions are here shown as formed of flexible elastic material, such as paste-board, and cut of such length that they fit each other within the case 6, as follows: The central portion *a* covers one of the sides of the case, and being scored and bent at the angles, the portions *b* extend to the center of the contiguous sides. From this point, the ends of the strip are bent inward, as at *c* and meet at the center of the side *a*, forming one-half of a diamond. The other half is formed in the same manner and when inserted in the case 6 they are in position to receive the container previously described, and when this is in place the projecting segmental edges of the disks 3 will rest against the center of the sides of the diamond-shaped cushion, the elasticity of which serve to absorb any shocks that may occur; such shocks being in a measure softened by the diagonal position of the cushions with relation to the outer supporting case.

Having thus described my invention what I claim and desire to secure by Letters Patent is—

1. An egg carrier comprising inner and outer spaced rectangular members, egg supporting disks on the inner members having their edges projected beyond said inner members, cushioning members consisting of integral central and side portions for engaging the inner faces of the outer member, said side portions terminating in inwardly directed integral portions, the ends of which meet and bear against the central portions, said inwardly directed portions being engaged by the projected edges of the disks, whereby the meeting ends of the last named portions are held in engagement with said central portions.

2. An egg carrier comprising inner and outer members, the inner member having egg supporting disks the edges of which project beyond the inner members and cushioning devices interposed between the inner and outer members, said cushioning devices being yieldably engaged by the projected edges of the disks, whereby the inner member is spaced from the cushioning devices.

3. In combination with an egg container, and a case therefor, a single pair of cushions each having a U-shaped body and inclined inner wings, the two bodies forming a rectangular inclosure for the container and the wings being directly engaged by the container.

4. A cushion for boxes consisting of a body portion, wing portions at substantially right angles thereto, said portions being adapted for engagement with three sides of the box, the wings having extensions forming inner wings which latter have their free ends engaged with the body portion at points substantially central of the space between the first mentioned wing portions.

5. In combination with an egg container having segmental projections, cushioning members which engage said projections, each projection engaging a side of the cushioning members at a point central of the length of a side.

6. A cushion for boxes consisting of a single pair of U-shaped members arranged to have the free ends of the legs of the members contact whereby the members conjointly provide a rectangular exterior, and cushioning means borne by said members and located on the interiors thereof.

7. In combination with an egg container having segmental projections, a pair of cushioning members which conjointly encompass the container, each of said members having a pair of cushioning parts engaged at central points by the respective projections.

In testimony whereof I have hereunto set my hand in the presence of two subscribing witnesses.

MacKEE B. WALLACE.

Witnesses:
JOHN H. HERRING,
W. W. HEALEY.